(12) United States Patent
Yamato et al.

(10) Patent No.: US 12,427,731 B2
(45) Date of Patent: Sep. 30, 2025

(54) FIBER-REINFORCED COMPOSITE MATERIAL SHAPING DEVICE AND FIBER-REINFORCED COMPOSITE MATERIAL SHAPING METHOD

(71) Applicant: MITSUBISHI HEAVY INDUSTRIES, LTD., Tokyo (JP)

(72) Inventors: Homare Yamato, Tokyo (JP); Hiroshi Tokutomi, Tokyo (JP); Hiroaki Nakamura, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 206 days.

(21) Appl. No.: 18/016,551

(22) PCT Filed: Dec. 14, 2020

(86) PCT No.: PCT/JP2020/046549
§ 371 (c)(1),
(2) Date: Jan. 17, 2023

(87) PCT Pub. No.: WO2022/130459
PCT Pub. Date: Jun. 23, 2022

(65) Prior Publication Data
US 2023/0278298 A1    Sep. 7, 2023

(51) Int. Cl.
*B29C 70/48* (2006.01)
*B29C 70/54* (2006.01)

(52) U.S. Cl.
CPC .............. *B29C 70/48* (2013.01); *B29C 70/54* (2013.01)

(58) Field of Classification Search
CPC ....... B29C 70/48; B29C 70/54; B29C 33/306; B29C 33/44; B29C 70/548; B29C 70/443; B29D 99/0014
See application file for complete search history.

(56) References Cited

U.S. PATENT DOCUMENTS 5,721,034 A    2/1998    Seemann, III et al.

FOREIGN PATENT DOCUMENTS

| JP | H05-035235 U | 5/1993 |
| JP | H11-254566 A | 9/1999 |
| JP | 2000-043173 A | 2/2000 |
| JP | 6728856 B2 | 7/2020 |

OTHER PUBLICATIONS

PCT/ISA/210, "International Search Report for PCT International Application No. PCT/JP2020/046549," Feb. 22, 2021.

*Primary Examiner* — S. Behrooz Ghorishi
(74) *Attorney, Agent, or Firm* — HAUPTMAN HAM, LLP

(57) ABSTRACT

Provided is a fiber-reinforced composite material shaping device including: core units; a shaping mold having a recessed portion for accommodating the core units; a seal member for sealing a fiber base material in the shaping mold to form a sealed space; an aspiration unit for reducing the pressure in the sealed space; a resin injection unit for injecting a resin material into the sealed space; and moving mechanisms for separating a first shaping surface away from the fiber base material, which contains a resin material that has been shaped by the first shaping surface and cured. Formed on the first shaping surface is a first groove section extending in a predetermined direction. The moving mechanisms move the core units along a predetermined direction in which the first groove section extends, while maintaining a state in which the first shaping surface is in contact with the fiber base material.

2 Claims, 12 Drawing Sheets

FIBER-REINFORCED COMPOSITE MATERIAL SHAPING DEVICE AND FIBER-REINFORCED COMPOSITE MATERIAL SHAPING METHOD

RELATED APPLICATIONS

The present application is National Phase of International Application No. PCT/JP2020/046549 filed Dec. 14, 2020, the disclosure of which is hereby incorporated by reference herein in its entirety.

TECHNICAL FIELD

The present disclosure relates to a fiber-reinforced composite material molding device and a fiber-reinforced composite material molding method.

BACKGROUND ART

In the related art, a fiber-reinforced composite material such as a fiber-reinforced plastic in which a resin is reinforced with a fiber preform such as glass fiber or carbon fiber is known (see, for example, PTL 1). PTL 1 discloses a method of molding a fiber-reinforced composite material to which resin transfer molding (RTM) is applied, in which a fiber preform is infiltrated by a resin by utilizing a pressure difference between a vacuum pressure and an atmospheric pressure. In PTL 1, a core material, which is a molding tool for forming a composite material, has a large groove serving as a passage for a resin and a large number of small grooves branched from the large groove. The resin is diffused in a surface direction of the fiber preform via the large groove and the small grooves, and the diffused resin infiltrates in a thickness direction of the fiber preform.

CITATION LIST

Patent Literature

[PTL 1] Japanese Unexamined Patent Application Publication No. H11-254566

SUMMARY OF INVENTION

Technical Problem

In a case where a fiber preform is infiltrated by a resin by a molding tool having a groove portion and the fiber preform is cured, the resin is cured along a shape of the groove portion and adheres to a surface of the fiber preform. When the molding tool is moved so as to be separated from the surface of the fiber preform, the molding tool does not interfere with the cured resin along the shape of the groove portion.

However, in a case where it is necessary to move the molding tool in a state of being in contact with the surface of the fiber preform, for example, in a case of using a molding tool in which a cavity having a shape having an undercut is formed, the molding tool interferes with the resin that is cured along the shape of the groove portion. When the molding tool interferes with the resin cured along the shape of the groove portion, the molding tool cannot be moved appropriately, or there is a possibility that the resin cured along the shape of the groove portion is peeled off by moving the molding tool, and a molded product is damaged.

The present disclosure has been made in view of such circumstances, and an object thereof is to provide a fiber-reinforced composite material molding device and a fiber-reinforced composite material molding method in which a core portion can be moved without interfering with a product, and a resin material can be diffused in a surface direction of a fiber preform to infiltrate into the entire fiber preform.

Solution to Problem

A fiber-reinforced composite material molding device according to an aspect of the present disclosure includes: a core portion having a first molding surface for molding a fiber preform; a molding tool having a second molding surface for molding the fiber preform and a recessed portion that accommodates the core portion; a sealing member that forms a sealed space by sealing the fiber preform on the molding tool in which the core portion is accommodated in the recessed portion, a suction portion that suctions air from the sealed space to depressurize the sealed space; a resin injection portion that injects a resin material into the fiber preform which is sealed in the sealed space depressurized by the suction portion; and a moving mechanism that separates the first molding surface from the fiber preform including the resin material which is molded by the first molding surface and cured, in which a first groove portion which extends in a predetermined direction and through which the resin material flows is formed on the first molding surface, and the moving mechanism moves the core portion along the predetermined direction in which the first groove portion extends, while maintaining a state in which the first molding surface is in contact with the fiber preform.

A fiber-reinforced composite material molding method according to another aspect of the present disclosure includes: a disposing step of disposing a core portion having a first molding surface for molding a fiber preform in a recessed portion of a molding tool having a second molding surface for molding the fiber preform; a sealing step of forming a sealed space by sealing the fiber preform on the molding tool in which the core portion is accommodated in the recessed portion, with a sealing member; a resin injection step of suctioning air from the sealed space to depressurize the sealed space and injecting a resin material into the fiber preform sealed in the sealed space; and a moving step of separating the first molding surface from the fiber preform including the resin material which is molded by the first molding surface and cured, in which a first groove portion which extends in a predetermined direction and through which the resin material flows is formed on the first molding surface, and in the moving step, the core portion is moved along the predetermined direction in which the first groove portion extends, while maintaining a state in which the first molding surface is in contact with the fiber preform.

Advantageous Effects of Invention

According to the present disclosure, it is possible to provide a fiber-reinforced composite material molding device and a fiber-reinforced composite material molding method in which a core portion can be moved without interfering with a product, and a resin material can be diffused in a surface direction of a fiber preform to infiltrate into the entire fiber preform.

DESCRIPTION OF EMBODIMENTS

Figure 1:
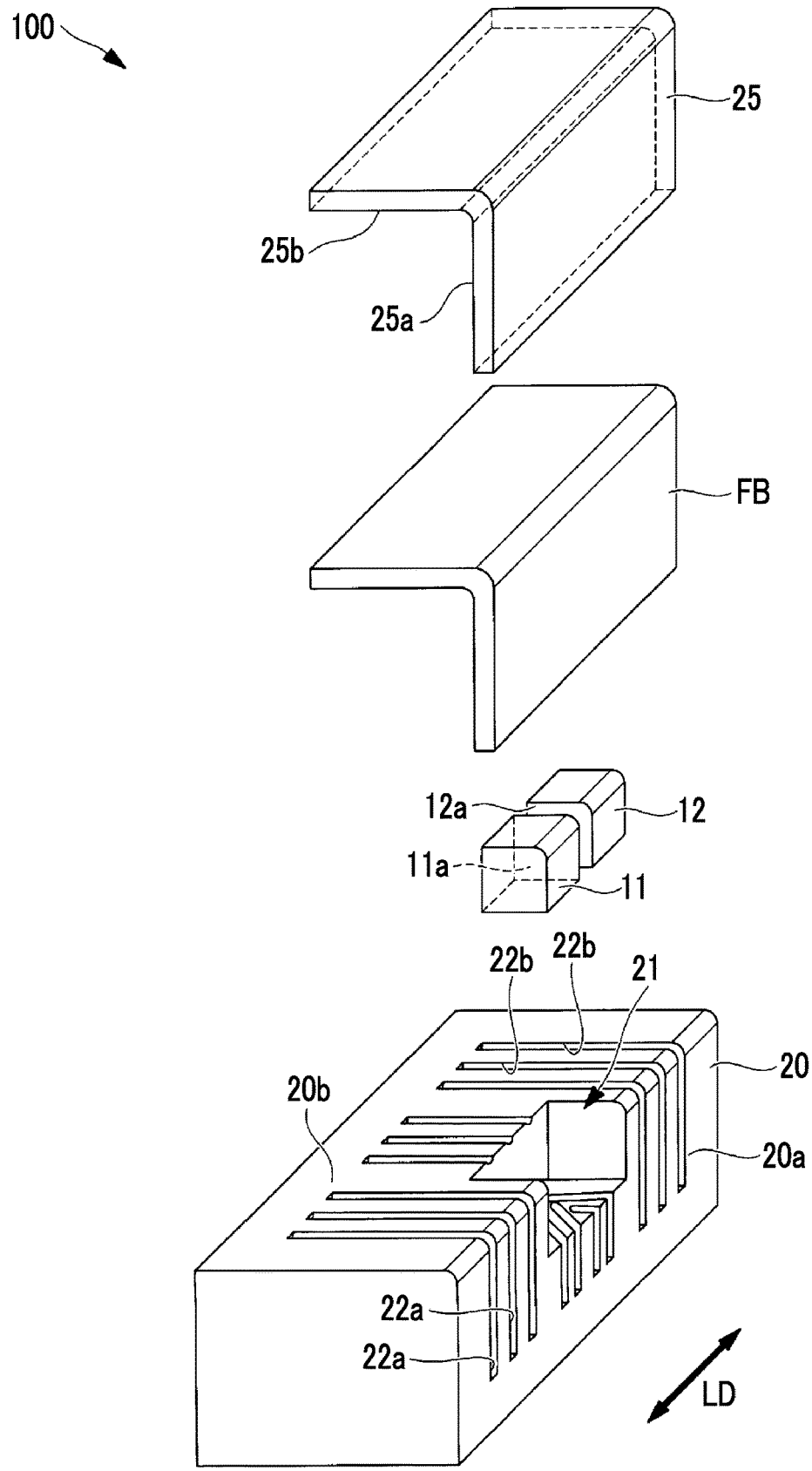
FIG. 1 is a perspective view showing a state in which a molding device according to an embodiment of the present disclosure is disassembled.
Figure 2:
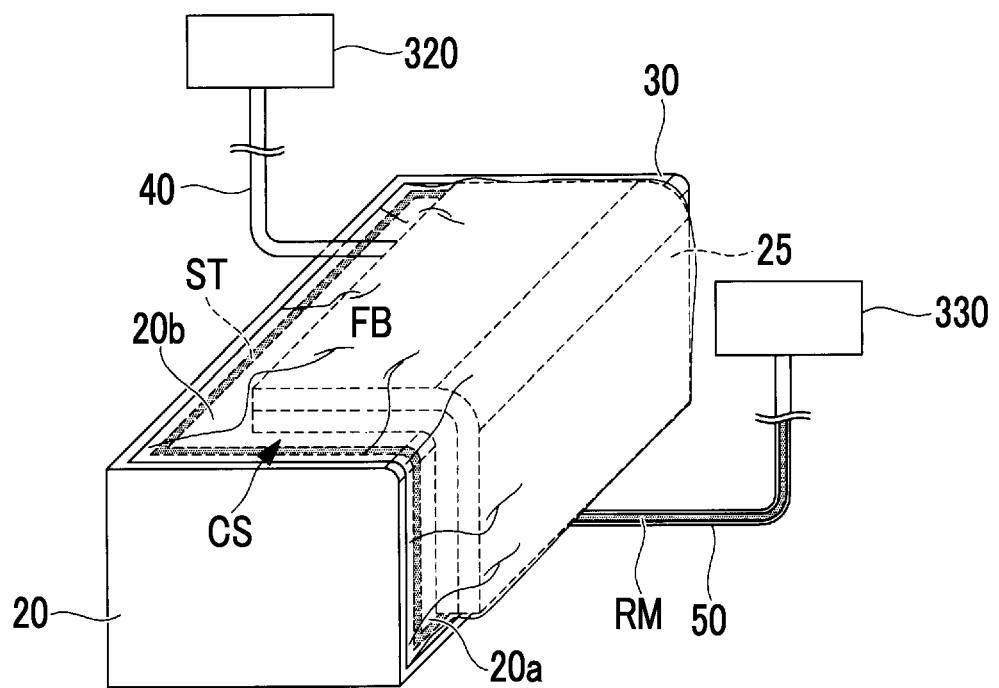
FIG. 2 is a perspective view showing a state in which the molding device according to the embodiment of the present disclosure is assembled.
Figure 3:
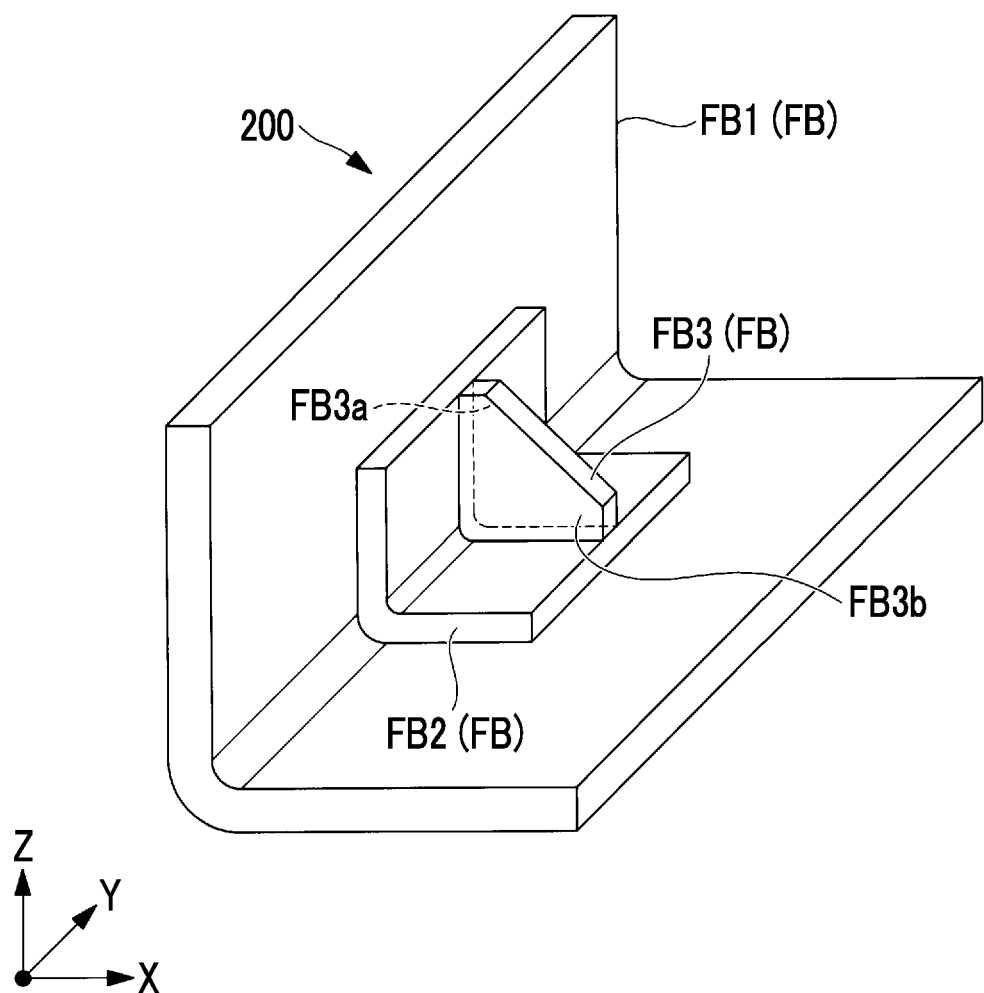
FIG. 3 is a perspective view showing a composite material molded by the molding device according to the embodiment of the present disclosure.

Hereinafter, a molding device (fiber-reinforced composite material molding device) 100 and a fiber-reinforced composite material molding method according to an embodiment of the present disclosure will be described with reference to the drawings. FIG. 1 is a perspective view showing a state in which the molding device 100 according to the embodiment of the present disclosure is disassembled. FIG. 2 is a perspective view showing a state in which the molding device according to the embodiment of the present disclosure is assembled. FIG. 3 is a perspective view showing a composite material molded by the molding device 100 according to the embodiment of the present disclosure. In FIG. 1, a bagging film 30, a suction line 40, and a resin injection line 50, which will be described later, are not illustrated.

As shown in FIGS. 1 and 2, the molding device 100 of the present embodiment includes a pair of core portions 11 and 12, a first curing mold (molding tool) 20, a second curing mold 25, the bagging film (sealing member) 30, the suction line (suction portion) 40, the resin injection line (resin injection portion) 50, and moving mechanisms 61 and 62 (see FIG. 5 described later).

The molding device 100 of the present embodiment is a device that performs infusion molding in which a fiber preform FB is sealed with the bagging film 30 in a state where the fiber preform FB is sandwiched between the first curing mold 20 and the second curing mold 25, and a sealed space CS is depressurized to allow a resin material RM to fill the sealed space CS and cure. Infusion molding is a method of resin transfer molding (RTM) or resin infusion in which a fiber preform is infiltrated by a resin by utilizing a pressure difference between a vacuum pressure and an atmospheric pressure.

As an example, the molding device 100 of the present embodiment molds a composite material (fiber-reinforced composite material) 200 shown in FIG. 3. The composite material 200 shown in FIG. 3 is, for example, a member used as a reinforcing material for reinforcing an aircraft fuselage. The composite material 200 has a long shape extending along a Y-axis direction, and is formed by causing a first fiber preform FB1, a second fiber preform FB2, and a third fiber preform FB3 to be infiltrated by the resin material RM and curing the resin material RM.

As shown in FIG. 3, the first fiber preform FB1 is a member that has a long shape extending along the Y-axis direction, and is formed in a substantially L-shape in a cross-sectional view in which a side disposed parallel to an XY plane and a side disposed parallel to a YZ plane are connected by end portions. The second fiber preform FB2 is a member that is smaller than the first fiber preform FB1, has a long shape extending along the Y-axis direction, and is formed in a substantially L-shape in a cross-sectional view in which a side disposed parallel to the XY plane and a side disposed parallel to the YZ plane are connected by end portions.

The third fiber preform FB3 is a member having a substantially triangular shape that is disposed parallel to an XZ plane, and is a member of which an end surface is in contact with a substantially L-shaped portion of the second fiber preform FB2. The third fiber preform FB3 is a member that reinforces the second fiber preform FB2 so as to maintain a shape of the substantially L-shaped portion. The second fiber preform FB2 is a member that reinforces the first fiber preform FB1 so as to maintain a shape of a substantially L-shaped portion thereof in a state of being reinforced by the third fiber preform FB3.

The fiber preform FB (the first fiber preform FB1, the second fiber preform FB2, and the third fiber preform FB3) is a member formed by laminating a plurality of layers of sheets formed of a reinforcing fiber material such as carbon fiber or glass fiber. Alternatively, the fiber preform FB may be a prepreg pre-infiltrated by the resin material RM, a prepreg partially infiltrated by the resin material RM, or a combination of the prepreg and the reinforcing fiber material. The resin material RM is, for example, a thermosetting resin material such as an epoxy resin, an unsaturated polyester, a vinyl ester, a phenol, a cyanate ester, and a polyimide.

In the following description, the resin material RM is a thermosetting resin material, but for example, a thermoplastic resin may also be used. Examples of the thermoplastic resin include polyether ether ketone (PEEK), polyethylene terephthalate (PET), polybutylene terephthalate (PBT), nylon 6 (PA6), nylon 66 (PA66), polyphenylene sulfide (PPS), polyetherimide (PEI), and polyetherketoneketone (PEKK).

In the composite material 200 shown in FIG. 3, the third fiber preform FB3 is disposed parallel to the XZ plane so as to be orthogonal to the sides of the first fiber preform FB1 and the second fiber preform FB2 having a substantially L-shape. In order to mold the composite material 200 having a shape in which the first fiber preform FB1, the second fiber preform FB2, and the third fiber preform FB3 are combined, the molding device 100 of the present embodiment is provided with a recessed portion 21 in the first curing mold 20, and uses the core portion 11 and the core portion 12 accommodated in the recessed portion 21. By molding the composite material 200 in a state where the core portion 11 and the core portion 12 are inserted into the recessed portion 21, a shape of the fiber preform FB can be maintained during molding of the composite material 200.

The core portion 11 and the core portion 12 are members accommodated in the recessed portion 21 of the first curing mold 20 with the third fiber preform FB3 interposed therebetween. The core portion 11 has a molding surface (first molding surface) 11a for molding the third fiber preform FB3. The core portion 12 has a molding surface (first molding surface) 12a for molding the third fiber preform FB3.

The molding surface 11a of the core portion 11 is a surface for molding an end surface FB3a (a surface hidden in FIG. 3) parallel to the XZ plane of the third fiber preform FB3 shown in FIG. 3. The molding surface 12a of the core portion 12 is a surface for molding an end surface FB3b (a surface that is not hidden in FIG. 3) parallel to the XZ plane of the third fiber preform FB3 shown in FIG. 3. The core portion 11 and the core portion 12 are members having a hardness capable of maintaining a constant shape even in a case where the sealed space CS is in a vacuum state.

As shown in FIG. 1, the first curing mold 20 is formed in a substantially rectangular parallelepiped shape, and has the recessed portion 21 formed at a corner portion of a central region in a longitudinal direction LD. The first curing mold 20 is formed of a material having a hardness capable of maintaining a constant shape even in the case where the sealed space CS is in the vacuum state.

The first curing mold 20 has a molding surface 20a for molding the first fiber preform FB1 and a molding surface 20b for molding the first fiber preform FB1. On the molding surface 20a of the first curing mold 20, a plurality of groove portions 22a for diffusing the resin material RM into the first fiber preform FB1 are formed. On the molding surface 20b of the first curing mold 20, a plurality of groove portions 22b for diffusing the resin material RM into the first fiber preform FB1 are formed.

The second curing mold 25 extends along the longitudinal direction LD and is formed in a substantially L-shape in cross-sectional view. The second curing mold 25 is a member having a hardness capable of maintaining a constant shape even in the case where the sealed space CS is in the vacuum state.

The second curing mold 25 has a molding surface 25a for molding the first fiber preform FB1 and a molding surface 25b for molding the first fiber preform FB1. On the molding surface 25a of the second curing mold 25, a plurality of groove portions (not shown) for diffusing the resin material RM into the first fiber preform FB1 are formed. On the molding surface 25b of the second curing mold 25, a plurality of groove portions (not shown) for diffusing the resin material RM into the first fiber preform FB1 are formed.

As shown in FIG. 2, the bagging film 30 is a member that forms the sealed space CS by sealing the first curing mold 20 and the second curing mold 25 in which the core portion 11 and the core portion 12 are accommodated in the recessed portion 21, with the fiber preform FB. The bagging film 30 is formed of, for example, a resin material primarily containing nylon. The bagging film 30 is joined to the first curing mold 20 by a sealant tape ST so as to cover an entire periphery of the molding surface 20a and the molding surface 20b of the first curing mold 20.

As shown in FIG. 2, the suction line 40 is a pipe body having one end connected to a suction source 320 such as a vacuum pump and the other end connected to the sealed space CS. The suction line 40 connects the suction source 320 to the sealed space CS and thus allows the air existing in the sealed space CS to be suctioned and discharged from the sealed space CS, so that a pressure of the sealed space CS can be reduced to a pressure (for example, vacuum pressure) lower than the atmospheric pressure.

As shown in FIG. 2, the resin injection line 50 is a pipe body that injects the resin material RM into the fiber preform FB sealed in the sealed space CS depressurized by the suction line 40. One end of the resin injection line 50 is connected to a supply source 330 for supplying the resin material RM, and the other end is connected to the sealed space CS. The resin injection line 50 connects the supply source 330 to the sealed space CS and thus can supply the resin material RM from the supply source 330 to the sealed space CS depressurized by the suction line 40.

Figure 4:
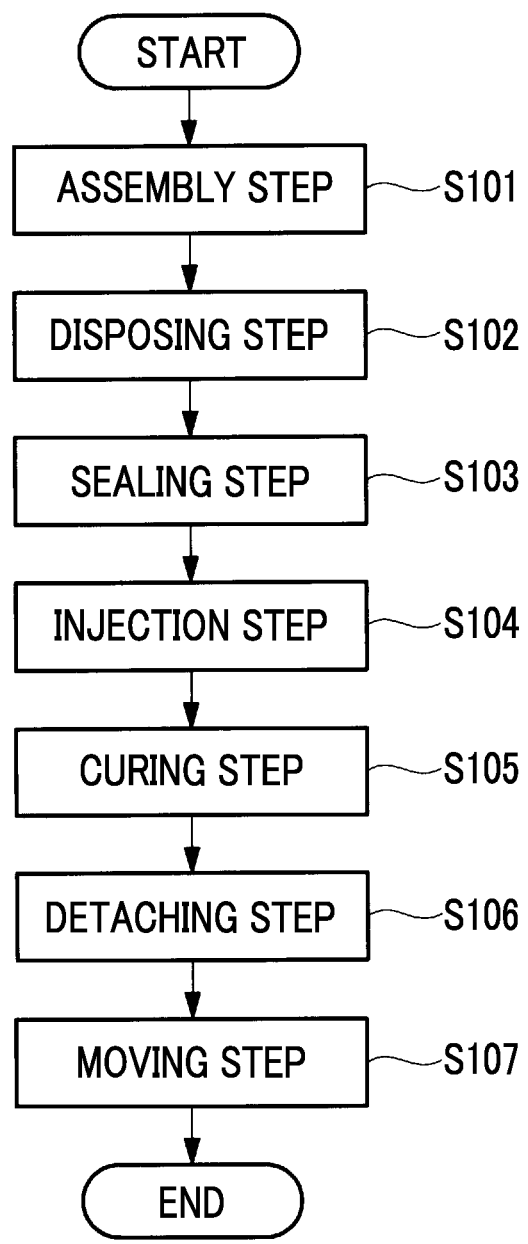
FIG. 4 is a flowchart showing a composite material molding method according to the embodiment of the present disclosure.

Next, a composite material molding method according to the present embodiment will be described with reference to the drawings. FIG. 4 is a flowchart showing the composite material molding method according to the present embodiment.

In step S101 (assembly step), assembly is performed so that the third fiber preform FB3 is sandwiched between the core portion 11 and the core portion 12, and the second fiber preform FB2 is in a state of being in contact with the core portion 11 and the core portion 12.

In step S102 (disposing step), the core portion 11 and the core portion 12 assembled in step S101 are disposed in the recessed portion 21 of the first curing mold 20 together with the second fiber preform FB2 and the third fiber preform FB3. Thereafter, the first fiber preform FB1 is disposed on the first curing mold 20 so as to be in contact with the molding surface 20a and the molding surface 20b of the first curing mold 20. Thereafter, the second curing mold 25 is disposed so that the molding surface 25a and the molding surface 25b come into contact with the first fiber preform FB1.

In step S103 (sealing step), the fiber preform FB is sealed in the first curing mold 20 and the second curing mold 25 to form the sealed space CS. Specifically, the bagging film 30 is joined to the first curing mold 20 by the sealant tape ST so as to cover an entire periphery of the first curing mold 20, so that the sealed space CS is formed. When the sealing step of step S103 is completed, a state shown in FIG. 2 is achieved.

In step S103, auxiliary materials such as a release film, a peel ply, and a breather may be disposed between the bagging film 30 and the fiber preform FB, as necessary. In addition, the formation of the sealed space CS by the bagging film 30 is an example. For example, another curing mold (not shown) may be disposed above the first curing mold 20 so as to cover the fiber preform FB disposed on the first curing mold 20, and the sealed space CS may be formed by the first curing mold 20 and the other curing mold.

In step S103 (sealing step), when the sealed space CS is formed, the resin injection line 50 connected to the supply source 330 of the resin material RM and the sealed space CS enter a state of communicating with each other. In addition, when the sealed space CS is formed, the suction line 40 connected to the suction source 320 and the sealed space CS enter a state of communicating with each other.

In step S104 (injection step), the air in the sealed space CS formed in step S102 (sealing step) is suctioned such that the sealed space CS is depressurized and the resin material RM is injected into the fiber preform FB sealed in the sealed space CS. Specifically, the suction source 320 is operated such that the air existing in the sealed space CS is discharged from the sealed space CS via the suction line 40 and the pressure of the sealed space CS is reduced to a vacuum state lower than the atmospheric pressure or a pressure close to the vacuum state.

Thereafter, the supply source 330 is brought into a state where the resin material RM can be supplied to the resin injection line 50, and the resin material RM is injected into the sealed space CS by a pressure difference between the resin injection line 50 and the depressurized sealed space CS. The resin material RM injected into the sealed space CS infiltrates into the fiber preform FB when the resin material RM is guided from a region into which the resin material RM is injected from the resin injection line 50 to a region suctioned by the suction line 40.

In step S104 (injection step), since the sealed space CS is depressurized to a vacuum state or a pressure close to the vacuum state, the fiber preform FB and the infiltrating resin material RM are pressurized by the atmospheric pressure.

In step S105 (curing step), the thermosetting resin material RM injected into the fiber preform FB in step S104 (injection step) is heated to a temperature equal to or higher than a thermosetting temperature by a heating unit (not shown) to cure the resin material RM.

In a case where a thermoplastic resin material RM is used, heating by the heating unit is not performed in step S105 (curing step). In step S105, the resin material RM is cooled so that the resin material RM is sufficiently lower than a softening temperature.

In step S106 (detaching step), the composite material 200 including the resin material RM and the fiber preform FB cured in step S104 (curing step) is detached from the molding device 100. Specifically, the sealant tape ST that joins the bagging film 30 and the first curing mold 20 is removed, and the bagging film 30 is detached from the first curing mold 20.

Next, the second curing mold 25 is detached from the first curing mold 20 from which the bagging film 30 has been detached. Thereafter, the composite material 200 (a product in which the fiber preform FB is infiltrated by the resin material RM and is cured) in a state where the core portion 11 and the core portion 12 are attached is detached from the first curing mold 20.

Figure 5:
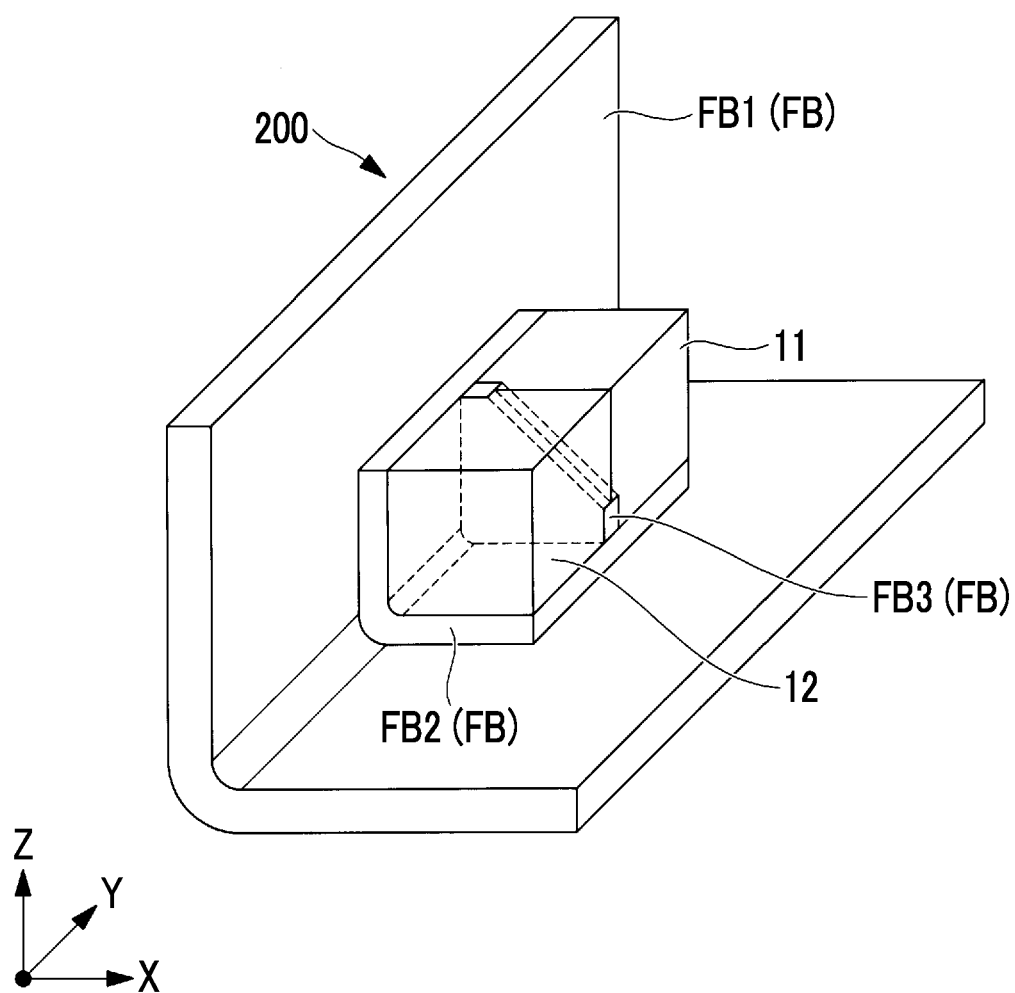
FIG. 5 is a perspective view showing a state in which the composite material molded by the molding device is detached from a first curing mold.
Figure 6:
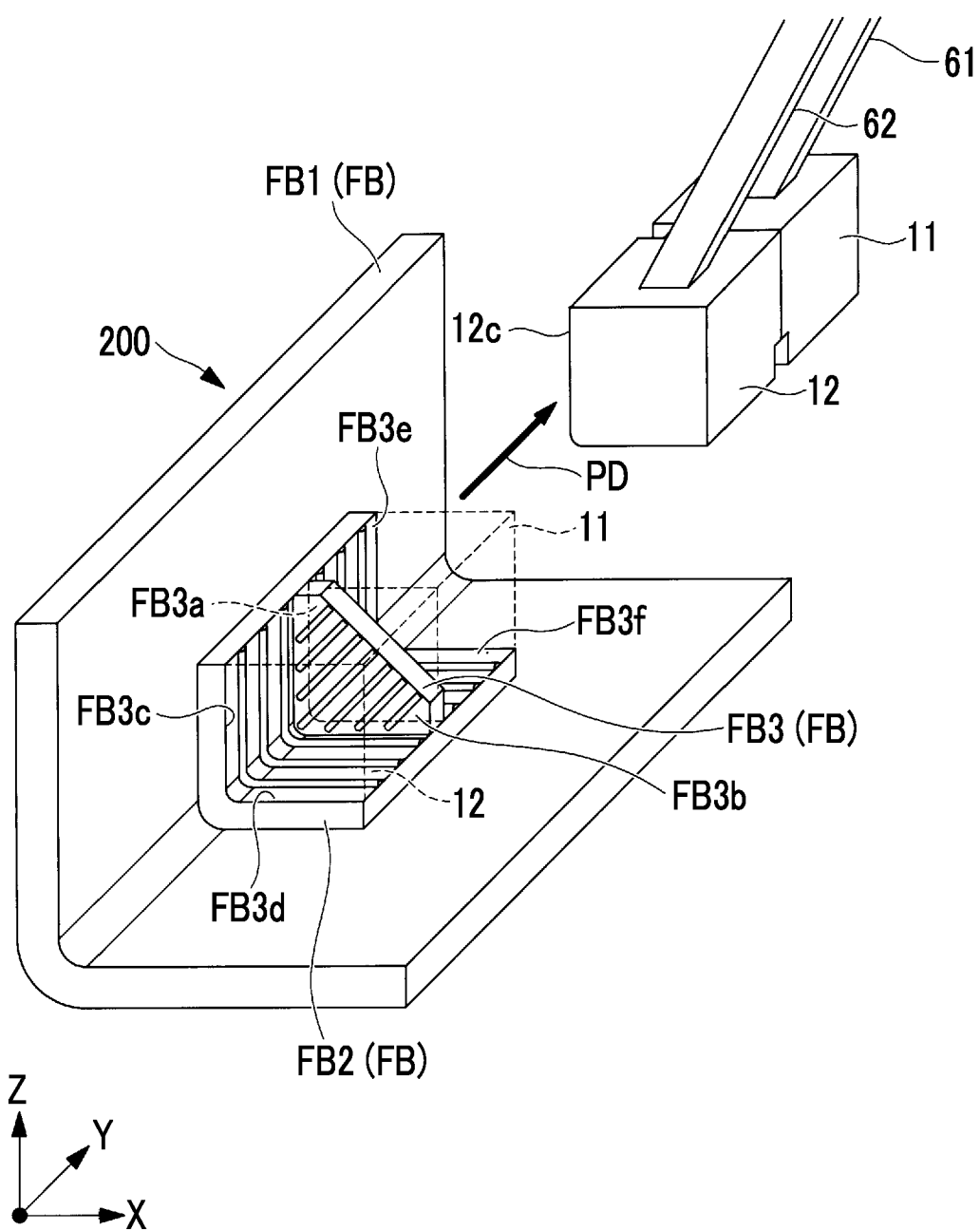
FIG. 6 is a perspective view showing a state in which core portions shown in FIG. 5 are moved by moving mechanisms.

FIG. 5 is a perspective view showing a state in which the composite material 200 molded by the molding device 100 is detached from the first curing mold 20. As shown in FIG. 5, the core portion 11 and the core portion 12 are in a state of being attached to the composite material 200. FIG. 6 is a perspective view showing a state in which the core portions 11 and 12 shown in FIG. 5 are moved by the moving mechanisms 61 and 62.

As shown in FIG. 6, in step S107 (moving step), the molding surface 11*a* is separated by the moving mechanism 61 from the third fiber preform FB3 containing the resin material RM molded and cured by the molding surface 11*a* of the core portion 11. In addition, in step S107, the molding surface 12*a* is separated by the moving mechanism 62 from the third fiber preform FB3 containing the resin material RM molded and cured by the molding surface 12*a* of the core portion 12.

In step S107, the moving mechanism 61 moves the core portion 11 along a predetermined direction PD in which groove portions (first groove portions) 11*b* formed on the molding surface 11*a* extend, while maintaining a state in which the molding surface 11*a* is in contact with the end surface FB3*a* of the third fiber preform FB3. In addition, in step S107, the moving mechanism 62 moves the core portion 12 along the predetermined direction PD in which groove portions (first groove portions) 12*b* formed on the molding surface 12*a* extend, while maintaining a state in which the molding surface 12*a* is in contact with the end surface FB3*b* of the third fiber preform FB3.

Figure 7:
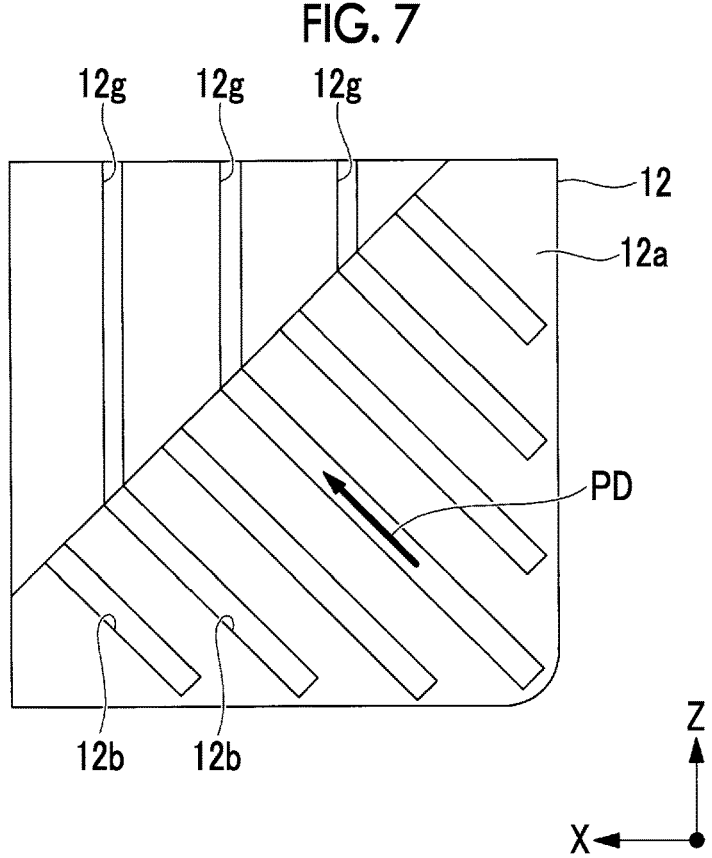
FIG. 7 is a view showing a molding surface of the core portion being in contact with an end surface of the third fiber preform.
Figure 8:
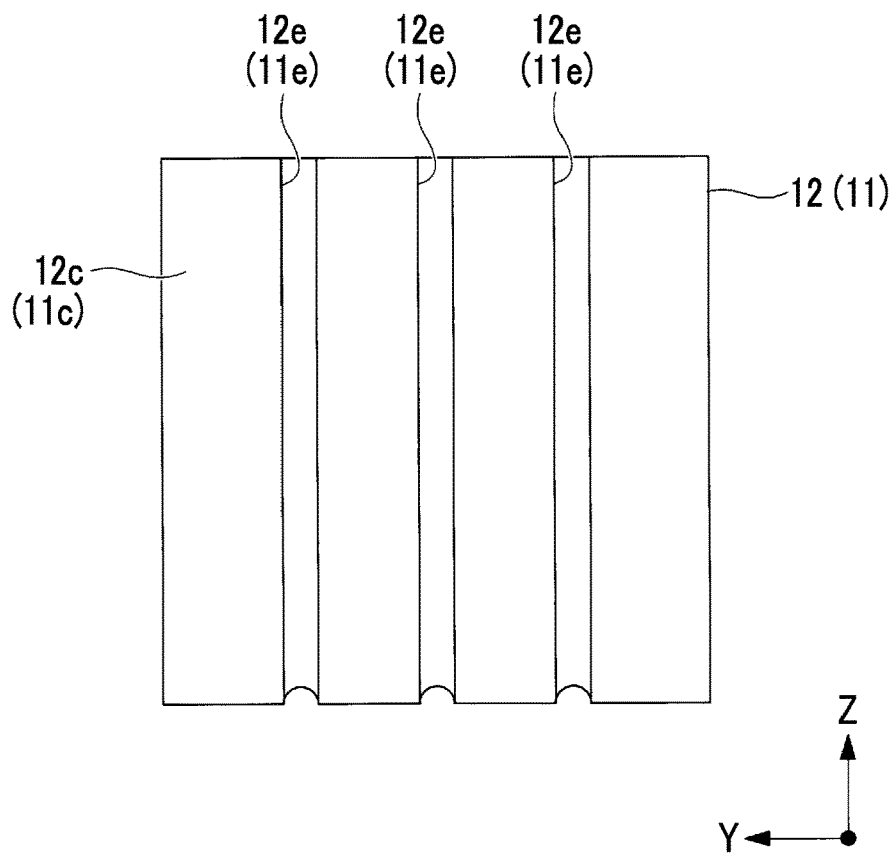
FIG. 8 is a view showing a side surface of the core portion being in contact with a side surface of a second fiber preform.
Figure 9:
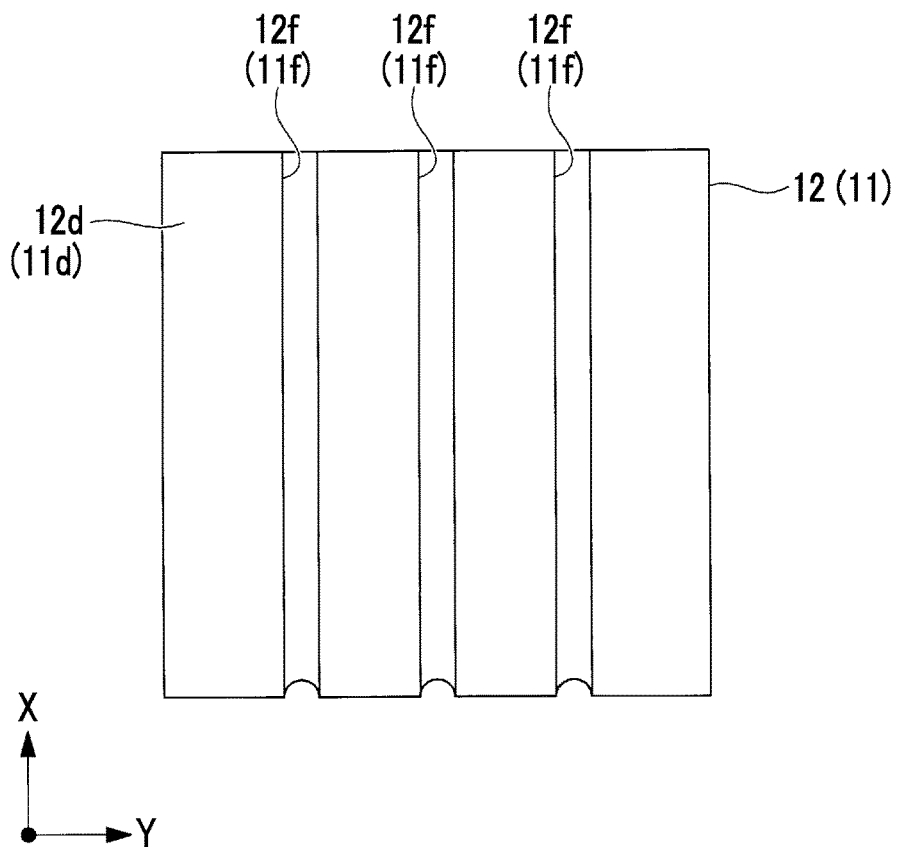
FIG. 9 is a view showing a bottom surface of the core portion being in contact with an upper surface of the second fiber preform.

Here, the groove portions 12*b* formed on the molding surface 12*a* will be described. FIG. 7 is a view showing the molding surface 12*a* of the core portion 12 being in contact with the end surface FB3*b* of the third fiber preform FB3. FIG. 8 is a view showing a side surface 12*c* of the core portion 12 being in contact with a side surface FB3*c* of the second fiber preform FB2. FIG. 9 is a view showing a bottom surface 12*d* of the core portion 12 being in contact with an upper surface FB3*d* of the second fiber preform FB2.

As shown in FIG. 7, on the molding surface 12*a* of the core portion 12, the groove portions 12*b* which extend in the predetermined direction PD on a plane parallel to the XZ plane and through which the resin material RM flows are formed. The groove portions 12*b* allow the resin material RM to flow such that the resin material RM is diffused into the end surface FB3*b* of the third fiber preform FB3 which is molded by the molding surface 12*a*.

As shown in FIG. 8, on the side surface 12*c* of the core portion 12, groove portions 12*e* which extend in a Z-axis direction on a plane parallel to the YZ plane and through which the resin material RM flows are formed. The groove portions 12*e* allow the resin material RM to flow such that the resin material RM is diffused into the side surface FB3*c* of the second fiber preform FB2 which is molded by the side surface 12*c*.

As shown in FIG. 9, on the bottom surface 12*d* of the core portion 12, groove portions 12*f* which extend in an X-axis direction on a plane parallel to the XY plane and through which the resin material RM flows are formed. The groove portions 12*f* allow the resin material RM to flow such that the resin material RM is diffused into the upper surface FB3*d* of the second fiber preform FB2 which is molded by the bottom surface 12*d*.

As shown in FIG. 6, a shape corresponding to the groove portions 12*b* formed on the molding surface 12*a* of the core portion 12 is formed on the end surface FB3*b*, a shape corresponding to the groove portions 12*e* formed on the side surface 12*c* of the core portion 12 is formed on the side surface FB3*c*, and a shape corresponding to the groove portions 12*f* formed on the bottom surface 12*d* of the core portion 12 is formed on the upper surface FB3*d*.

In step S107 (moving step), the moving mechanism 62 moves the core portion 12 along the predetermined direction PD in which the groove portions (first groove portions) 12*b* formed on the molding surface 12*a* extend, while maintaining a state in which the molding surface 12*a* is in contact with the end surface FB3*b* of the third fiber preform FB3. This is because the resin material RM cured along the shape of the groove portions 12*b* adheres to the end surface FB3*b* of the third fiber preform FB3 and enters a state of meshing with the groove portions 12*b*. Since the direction in which the core portion 12 moves coincides with the predetermined direction PD in which the groove portions 12*b* extend, when the core portion 12 moves, the groove portions 12*b* do not interfere with the resin material RM having a protruding shape formed on the end surface FB3*b* of the third fiber preform FB3.

Figure 10:
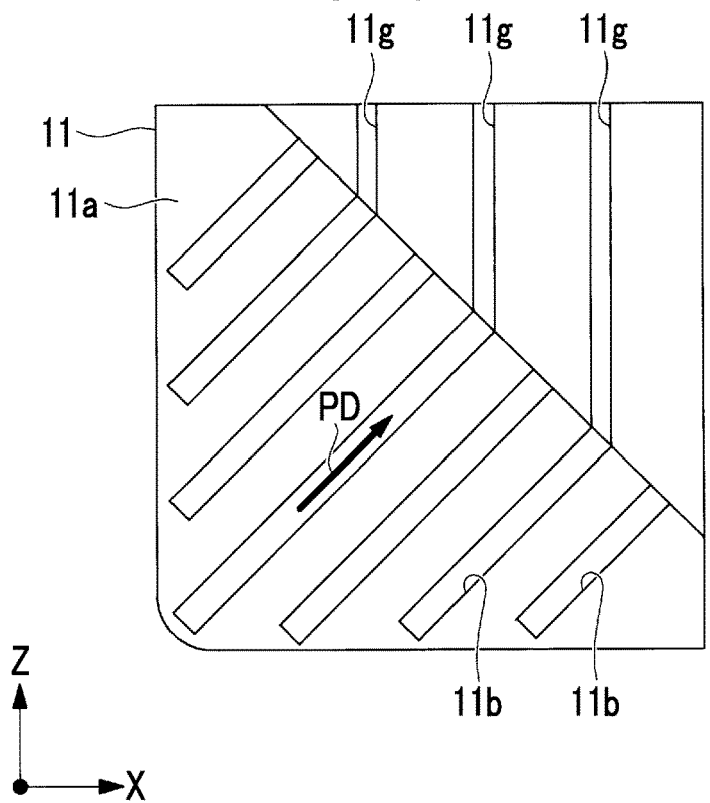
FIG. 10 is a view showing a molding surface of the core portion being in contact with an end surface of the third fiber preform.

Next, the groove portions 11*b* formed on the molding surface 11*a* will be described. FIG. 10 is a view showing the molding surface 11*a* of the core portion 11 being in contact with the end surface FB3*a* of the third fiber preform FB3. FIG. 8 is a view showing a side surface 11*c* of the core portion 11 being in contact with a side surface FB3*e* of the second fiber preform FB2. FIG. 9 is a view showing a bottom surface 11*d* of the core portion 11 being in contact with an upper surface FB3*f* of the second fiber preform FB2.

As shown in FIG. 10, on the molding surface 11*a* of the core portion 11, the groove portions 11*b* which extend in the predetermined direction PD on a plane parallel to the XZ plane and through which the resin material RM flows are formed. The groove portions 11*b* allow the resin material RM to flow such that the resin material RM is diffused into the end surface FB3*a* of the third fiber preform FB3 which is molded by the molding surface 11*a*.

As shown in FIG. 8, on the side surface 11*c* of the core portion 11, groove portions 11*e* which extend in the Z-axis direction on a plane parallel to the YZ plane and through which the resin material RM flows are formed. The groove portions 11*e* allow the resin material RM to flow such that the resin material RM is diffused into the side surface FB3*e* of the second fiber preform FB2 which is molded by the side surface 11*c*.

As shown in FIG. 9, on the bottom surface 11*d* of the core portion 11, groove portions 11*f* which extend in the X-axis direction on a plane parallel to the XY plane and through which the resin material RM flows are formed. The groove portions 11*f* allow the resin material RM to flow such that the resin material RM is diffused into the upper surface FB3*f* of the second fiber preform FB2 which is molded by the bottom surface 11*d*.

A shape corresponding to the groove portions 11*b* formed on the molding surface 11*a* of the core portion 11 is formed on the end surface FB3*a*, a shape corresponding to the groove portions 11*e* formed on the side surface 11*c* of the core portion 11 is formed on the side surface FB3*e*, and a shape corresponding to the groove portions 11*f* formed on the bottom surface 11*d* of the core portion 11 is formed on the upper surface FB3*f*.

In step S107 (moving step), the moving mechanism 61 moves the core portion 11 along the predetermined direction PD in which the groove portions (first groove portions) 11*b* formed on the molding surface 11*a* extend, while maintaining a state in which the molding surface 11*a* is in contact with the end surface FB3*a* of the third fiber preform FB3. This is because the resin material RM cured along the shape of the groove portions 11*b* adheres to the end surface FB3*a* of the third fiber preform FB3 and enters a state of meshing with the groove portions 11*b*. Since the direction in which the core portion 11 moves coincides with the predetermined direction PD in which the groove portions 11*b* extend, when the core portion 11 moves, the groove portions 11*b* do not interfere with the resin material RM having a protruding shape formed on the end surface FB3*a* of the third fiber preform FB3.

In step S107 described above, the moving mechanism 61 moves the core portion 11 and the moving mechanism 62 moves the core portion 12. However, another form may be used. For example, an operator may hold the core portion 11 via a bare hand or a jig (not shown) and move the core portion 11 in the same manner as the moving mechanism 61. Similarly, the operator may hold the core portion 12 via a bare hand or a jig (not shown) and move the core portion 12 in the same manner as the moving mechanism 62.

Next, core portions 11A and 12A of a modification example of the present embodiment and a moving step of moving the core portions 11A and 12A of the modification example will be described. The core portion 11A of the modification example is different from the core portion 11A described above in a shape of groove portions formed on a surface.

Figure 11:
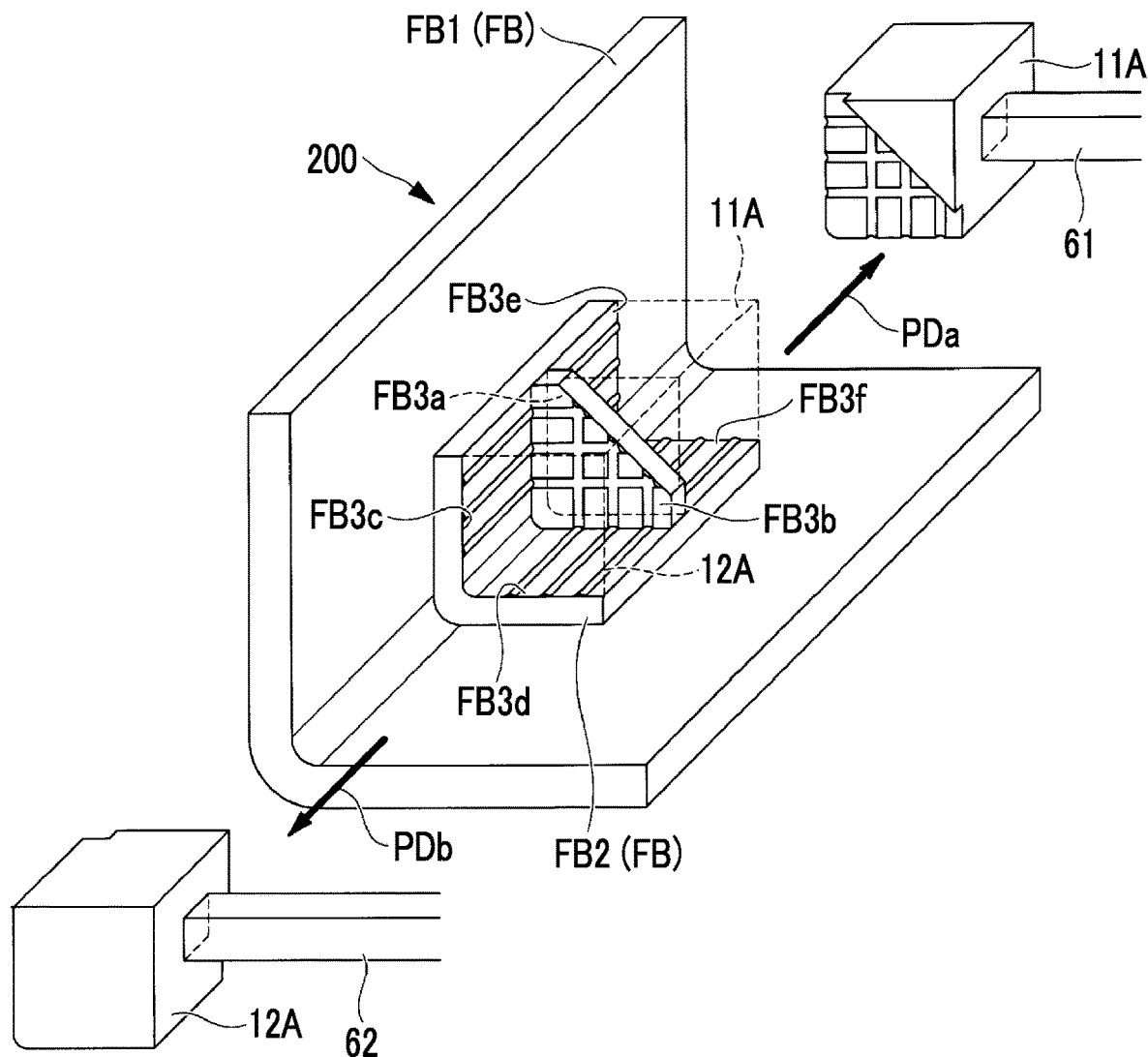
FIG. 11 is a perspective view showing a state in which core portions of a modification example are moved by the moving mechanisms.
Figure 12:
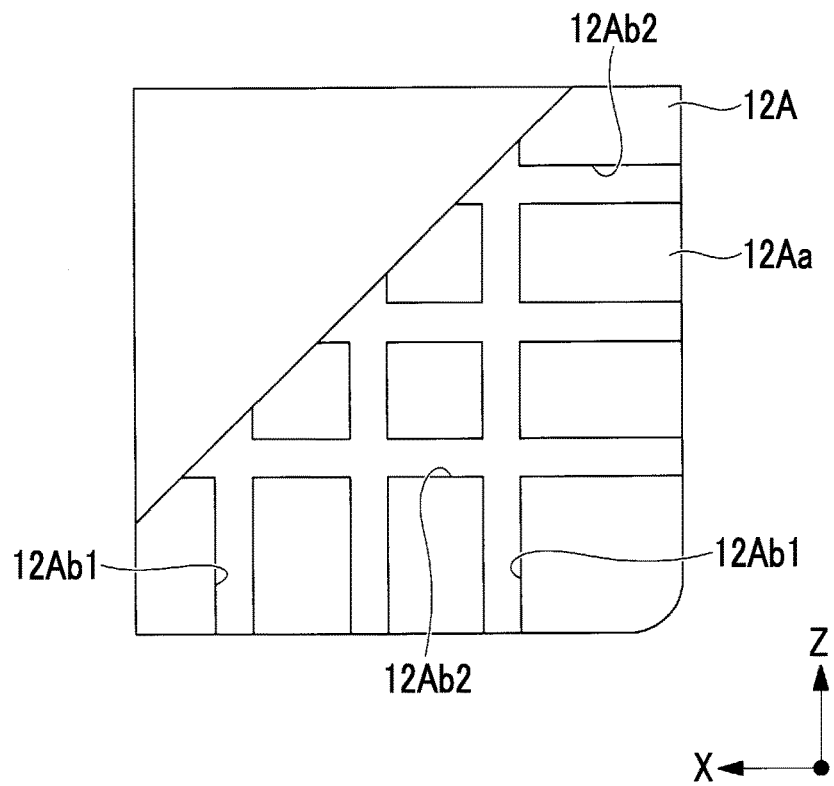
FIG. 12 is a view showing a molding surface of the core portion of the modification example being in contact with the end surface of the third fiber preform.
Figure 13:
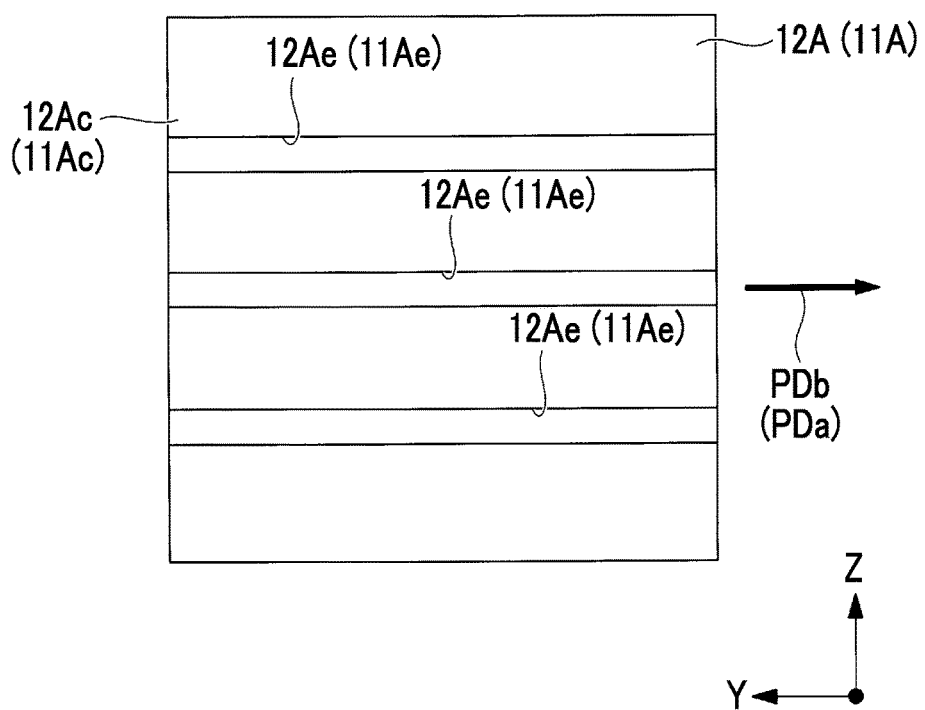
FIG. 13 is a view showing a side surface of the core portion of the modification example being in contact with the side surface of the second fiber preform.
Figure 14:
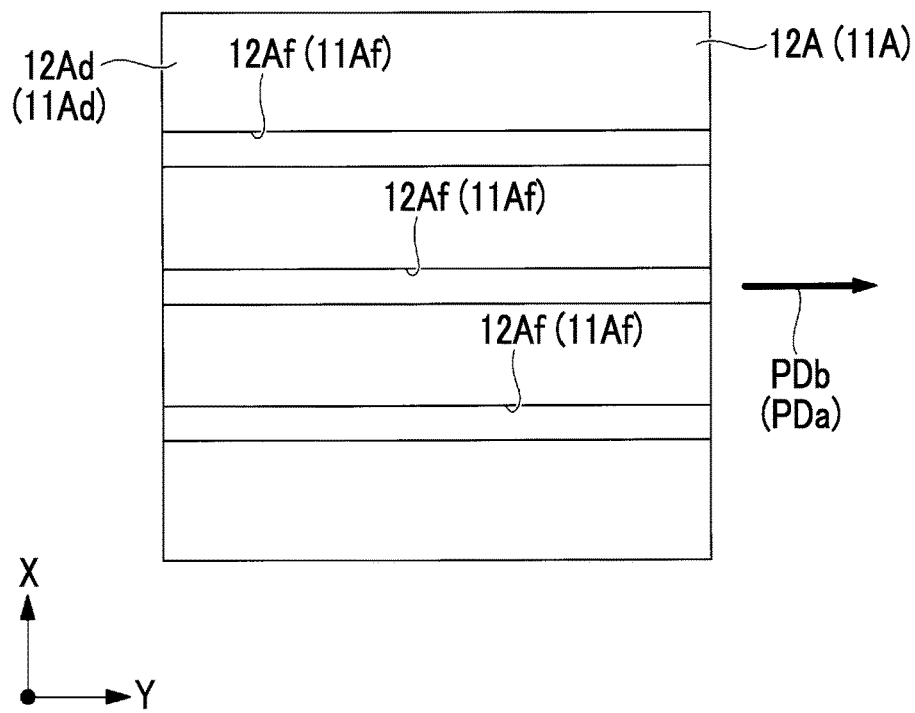
FIG. 14 is a view showing a bottom surface of a core portion of a modification example of contact with an upper surface of a second fiber preform.

Here, a predetermined direction PDb in which the core portion 12A is moved will be described. FIG. 11 is a perspective view showing a state in which the core portions 11A and 12A are moved by the moving mechanisms 61 and 62. FIG. 12 is a view showing a molding surface 12Aa of the core portion 12A being in contact with the end surface FB3*b* of the third fiber preform FB3. FIG. 13 is a view showing a side surface 12Ac of the core portion 12A being in contact with the side surface FB3*c* of the second fiber preform FB2. FIG. 14 is a view showing a bottom surface 12Ad of the core portion 12A being in contact with the upper surface FB3*d* of the second fiber preform FB2.

As shown in FIG. 12, on the molding surface 12Aa of the core portion 12A, a plurality of groove portions 12Ab1 which extend along a Z-axis on a plane parallel to the XZ plane and through which the resin material RM flows, and a plurality of groove portions 12Ab2 which extend along an X-axis and through which the resin material RM flows are formed. The groove portions 12Ab1 and the groove portions 12Ab2 allow the resin material RM to flow such that the resin material RM is diffused into the end surface FB3*b* of the third fiber preform FB3 which is molded by the molding surface 12Aa.

As shown in FIG. 13, on the side surface 12Ac of the core portion 12A, a plurality of groove portions 12Ae which extend along the predetermined direction PDb parallel to a Y-axis on a plane parallel to the YZ plane and through which the resin material RM flows are formed. The groove portions 12Ae allow the resin material RM to flow such that the resin material RM is diffused into the side surface FB3*c* of the second fiber preform FB2 which is molded by the side surface 12Ac.

As shown in FIG. 14, on the bottom surface 12Ad of the core portion 12A, a plurality of groove portions 12Af which extend along the predetermined direction PDb parallel to the Y-axis on a plane parallel to the XY plane and through which the resin material RM flows are formed. The groove portions 12Af allow the resin material RM to flow such that the resin material RM is diffused into the upper surface FB3*d* of the second fiber preform FB2 which is molded by the bottom surface 12Ad.

As shown in FIG. 11, a shape corresponding to the groove portions 12Ab1 and 12Ab2 formed on the molding surface 12Aa of the core portion 12A is formed on the end surface FB3*b*, a shape corresponding to the groove portions 12Ae formed on the side surface 12Ac of the core portion 12A is formed on the side surface FB3*c*, and a shape corresponding to the groove portions 12Af formed on the bottom surface 12Ad of the core portion 12A is formed on the upper surface FB3d.

In step S107 (moving step), the moving mechanism 62 moves the core portion 12A along the predetermined direction PDb in which the groove portions (first groove portions) 12Ae formed on the side surface 12Ac extend, while maintaining a state in which the side surface 12Ac is in contact with the side surface FB3c of the third fiber preform FB3. At this time, the moving mechanism 62 moves the core portion 12A along the predetermined direction PDb in which the groove portions (first groove portions) 12Af formed on the bottom surface 12Ad extend, while maintaining a state in which the bottom surface 12Ad is in contact with the upper surface FB3d of the third fiber preform FB3.

The core portion 12A is moved along the predetermined direction PDb because the resin material RM cured along the shapes of the groove portions 12Ae and the groove portions 12Af adheres to the side surface FB3c and the upper surface FB3d of the third fiber preform FB3 and enters a state of meshing with the groove portions 12Ae and the groove portions 12Af.

Since the direction in which the core portion 12A moves coincides with the predetermined direction PDb in which the groove portions 12Ae and the groove portions 12Af extend, when the core portion 12A moves, the groove portions 12Ae do not interfere with the resin material RM having a protruding shape formed on the side surface FB3c of the third fiber preform FB3. Similarly, when the core portion 12A moves, the groove portions 12Af do not interfere with the resin material RM having a protruding shape formed on the upper surface FB3d of the third fiber preform FB3.

Figure 15:
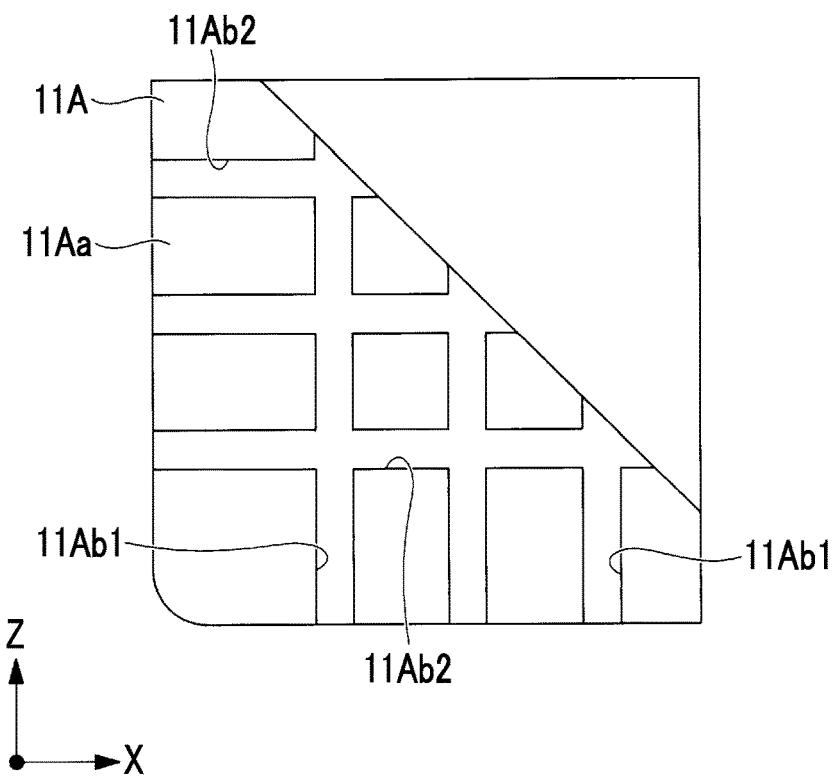
FIG. 15 is a diagram showing a molding surface of the core portion being in contact with the end surface of the third fiber preform.

Next, a predetermined direction PDa in which the core portion 11A is moved will be described. FIG. 15 is a view showing a molding surface 11Aa of the core portion 11A being in contact with the end surface FB3a of the third fiber preform FB3. FIG. 13 is a view showing a side surface 11Ac of the core portion 11A being in contact with the side surface FB3e of the second fiber preform FB2. FIG. 14 is a view showing a bottom surface 11Ad of the core portion 11A being in contact with the upper surface FB3f of the second fiber preform FB2.

As shown in FIG. 15, on the molding surface 11Aa of the core portion 11A, a plurality of groove portions 11Ab1 which extend along the Z-axis on a plane parallel to the XZ plane and through which the resin material RM flows, and a plurality of groove portions 11Ab2 which extend along the X-axis and through which the resin material RM flows are formed. The groove portions 11Ab1 and the groove portions 11Ab2 allow the resin material RM to flow such that the resin material RM is diffused into the end surface FB3a of the third fiber preform FB3 which is molded by the molding surface 11Aa.

As shown in FIG. 13, on the side surface 11Ac of the core portion 11A, a plurality of groove portions 11e which extend along the predetermined direction PDa parallel to the Y-axis on a plane parallel to the YZ plane and through which the resin material RM flows are formed. The groove portions 11Ae allow the resin material RM to flow such that the resin material RM is diffused into the side surface FB3e of the second fiber preform FB2 which is molded by the side surface 11Ac.

As shown in FIG. 14, on the bottom surface 11Ad of the core portion 11A, a plurality of groove portions 11Af which extend along the predetermined direction PDa parallel to the Y-axis on a plane parallel to the XY plane and through which the resin material RM flows are formed. The groove portions 11Af allow the resin material RM to flow such that the resin material RM is diffused into the upper surface FB3f of the second fiber preform FB2 which is molded by the bottom surface 11Ad.

A shape corresponding to the groove portions 11Ab1 and 11Ab2 formed on the molding surface 11Aa of the core portion 11A is formed on the end surface FB3a, and a shape corresponding to the groove portions 11Ae formed on the side surface 11Ac of the core portion 11A is formed on the side surface FB3e, and a shape corresponding to the groove portions 11Af formed on the bottom surface 11Ad of the core portion 11A is formed on the upper surface FB3f.

In step S107 (moving step), the moving mechanism 61 moves the core portion 11A along the predetermined direction PDa in which the groove portions (first groove portions) 11Ae formed on the side surface 11Ac extend, while maintaining a state in which the side surface 11Ac is in contact with the side surface FB3e of the third fiber preform FB3. At this time, the moving mechanism 61 moves the core portion 11A along the predetermined direction PDa in which the groove portions (first groove portions) 11Af formed on the bottom surface 11Ad extend, while maintaining a state in which the bottom surface 11Ad is in contact with the upper surface FB3f of the third fiber preform FB3.

The core portion 11A is moved along the predetermined direction PDa because the resin material RM cured along the shapes of the groove portions 11Ae and the groove portions 11Af adheres to the side surface FB3e and the upper surface FB3f of the third fiber preform FB3 and enters a state of meshing with the groove portions 11Ae and the groove portions 11Af.

Since the direction in which the core portion 11A moves coincides with the predetermined direction PDa in which the groove portions 11Ae and the groove portions 11Af extend, when the core portion 11A moves, the groove portions 11Ae do not interfere with the resin material RM having a protruding shape formed on the side surface FB3e of the third fiber preform FB3. Similarly, when the core portion 11A moves, the groove portions 11Af do not interfere with the resin material RM having a protruding shape formed on the upper surface FB3f of the third fiber preform FB3.

Figure 16:
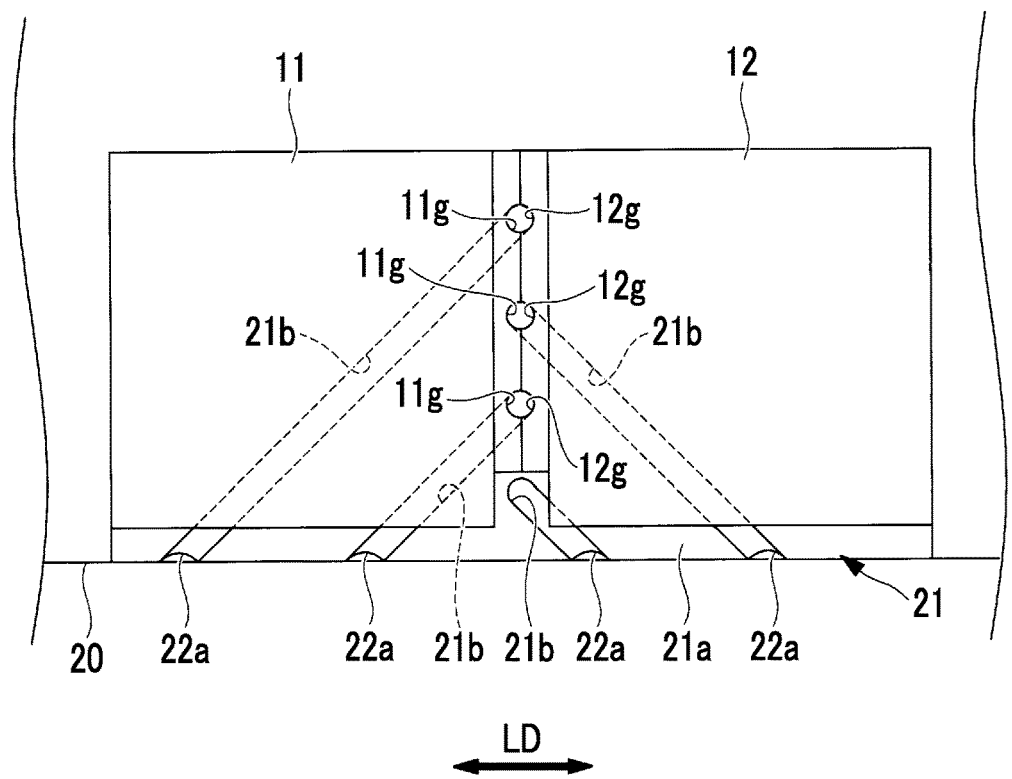
FIG. 16 is a plan view of the recessed portion of the first curing mold as viewed from above, and shows a state in which a pair of core portions are disposed.

Next, a structure in which the resin material RM guided to the recessed portion 21 of the first curing mold 20 is guided to the third fiber preform FB3 via the core portion 11 and the core portion 12 will be described. FIG. 16 is a plan view of the recessed portion 21 of the first curing mold 20 as viewed from above, and shows a state in which the pair of core portions 11 and 12 are disposed.

As shown in FIG. 1, the plurality of groove portions 22a are formed on the molding surface 20a of the first curing mold 20. In the longitudinal direction LD, the resin material RM guided to the groove portions 22a disposed at a position corresponding to the recessed portion 21 is guided to the recessed portion 21 via the groove portions 22a.

An upper surface (contact surface) 21a of the recessed portion 21 of the first curing mold 20 shown in FIG. 16 is a surface that comes into contact with the bottom surface 11d of the core portion 11 and the bottom surface 12d of the core portion 12. Groove portions (third groove portions) 21b through which the resin material RM flows between the recessed portion 21 and the core portions 11 and 12 are on the upper surface 21a.

As shown in FIG. 16, the core portion 11 has groove portions (second groove portions) 11g through which the resin material RM flows from the upper surface 21a of the recessed portion 21 toward the third fiber preform FB3. The core portion 12 has groove portions (second groove portions) 12*g* in which the resin material RM flows from the upper surface 21*a* of the recessed portion 21 toward the third fiber preform FB3.

The core portion 11 is disposed in the recessed portion 21 so that end portions of the groove portions 11*g* on an upper surface 21*a* side communicate with the groove portions 21*b*. The core portion 12 is disposed in the recessed portion 21 so that end portions of the groove portions 12*g* on the upper surface 21*a* side communicate with the groove portions 21*b*. The groove portions 11*g* and the groove portions 12*g* form flow paths through which the resin material RM flows from the upper surface 21*a* of the recessed portion 21 toward the third fiber preform FB3. Through the flow paths, the resin material RM guided to the recessed portion 21 of the first curing mold 20 can be guided to the third fiber preform FB3 via the core portion 11 and the core portion 12.

In FIG. 16, the groove portions 21*b* formed on the upper surface 21*a* of the recessed portion 21 are formed to extend toward a central portion of the recessed portion 21 in the longitudinal direction LD, but may have another form. For example, the groove portions 21*b* may be formed as shown in FIG. 17.

Figure 17:
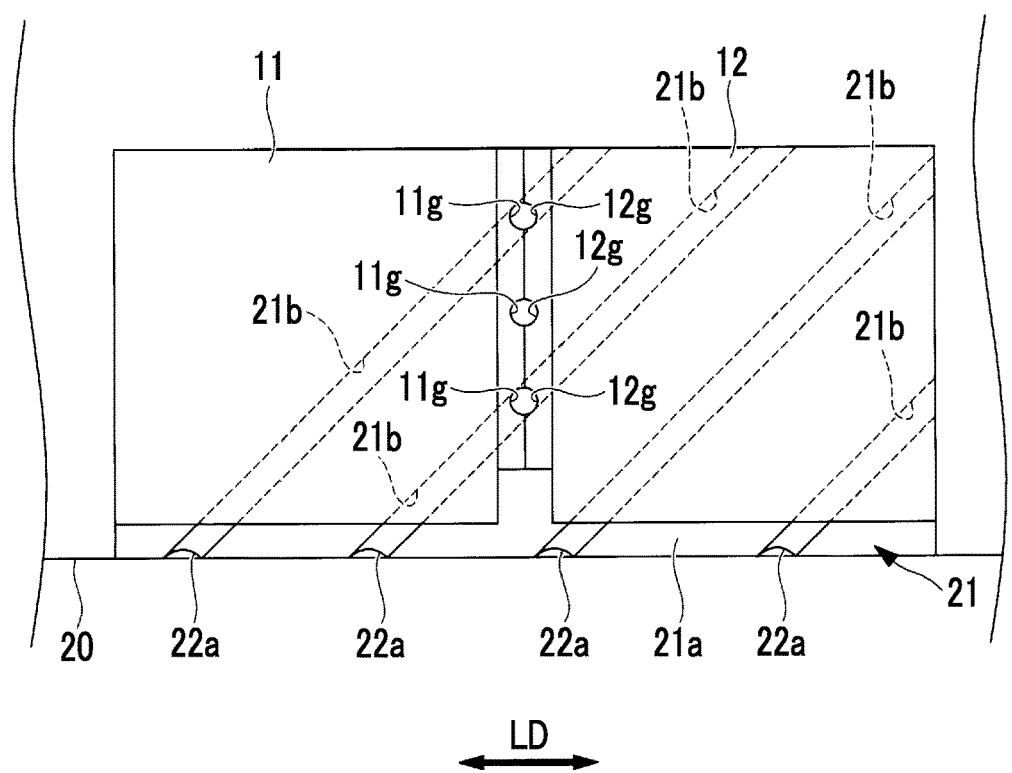
FIG. 17 is a plan view of the recessed portion of the first curing mold of the modification example as viewed from above, and shows a state in which a pair of the core portions are disposed.

FIG. 17 is a plan view of the recessed portion 21 of the first curing mold 20 of a modification example as viewed from above, and shows a state in which the pair of core portions 11 and 12 are disposed. As shown in FIG. 17, the plurality of groove portions 21*b* formed on the upper surface 21*a* of the recessed portion 21 may be formed to extend in the same direction. In this case, at least any one of the plurality of groove portions 21*b* is disposed so as to communicate with the end portions of the groove portions 11*g* of the core portion 11 and the groove portions 12*g* of the core portion 12.

Operations and effects exhibited by the molding device 100 of the present embodiment described above will be described.

According to the molding device 100 of the present embodiment, the fiber preform FB is disposed on the molding surfaces 11*a* and 12*a* of the core portions 11 and 12 and the molding surfaces 20*a* and 20*b* of the first curing mold 20, the sealed space CS is formed by sealing the fiber preform FB on the first curing mold 20 in which the core portions 11 and 12 are accommodated in the recessed portion 21 of the first curing mold 20, with the bagging film 30, and the air in the sealed space CS is suctioned to depressurize the sealed space CS, so that the resin material RM is injected into the sealed space CS. The resin material RM injected into the sealed space CS infiltrates into the fiber preform FB when the resin material RM is guided from a region into which the resin material RM is injected from the resin injection line 50 to a region suctioned by the suction line 40.

According to the molding device 100 of the present embodiment, on the molding surfaces 11*a* and 12*a* of the core portions 11 and 12, the groove portions 11*b* and 12*b* which extend in the predetermined direction PD and through which the resin material RM flows are formed. By allowing the resin material RM to flow through the groove portions 11*b* and 12*b*, the resin material RM is reliably diffused into the surfaces of the fiber preform FB which is molded by the molding surfaces 11*a* and 12*a* of the core portions 11 and 12. On the other hand, when the resin material remaining in the groove portions 11*b* and 12*b* is cured, the resin material RM cured along the shapes of the groove portions 11*b* and 12*b* adheres to the surfaces of the fiber preform FB and enters a state of meshing with the groove portions 11*b* and 12*b*.

According to the molding device 100 of the present embodiment, the moving mechanisms 61 and 62 move the core portions 11 and 12 along the predetermined direction PD in which the groove portions 11*b* and 12*b* extend, while maintaining a state in which the molding surfaces 11*a* and 12*a* are in contact with the fiber preform FB. Since the direction in which the core portions 11 and 12 move coincides with the predetermined direction PD in which the groove portions 11*b* and 12*b* extend, when the core portions 11 and 12 move, the groove portions 11*b* and 12*b* do not interfere with the resin material having a protruding shape formed on a surface of a product. Therefore, the core portions 11 and 12 can be moved without interfering with the product, and the resin material RM can be diffused in the surface direction of the fiber preform FB to infiltrate into the entire fiber preform FB.

In addition, according to the molding device 100 of the present embodiment, the end portions of the groove portions 11*g* and 12*g* on the upper surface 21*a* side through which the resin material RM flows from the upper surface 21*a* of the recessed portion 21 toward the fiber preform FB communicate with the groove portions 21*b* formed on the upper surface 21*a*. Therefore, the resin material RM flowing through the groove portions 21*b* can be reliably guided to the fiber preform FB via the groove portions 11*g* and 12*g*.

The fiber-reinforced composite material molding device according to the embodiment described above is identified as follows, for example.

The fiber-reinforced composite material molding device according to the present disclosure includes: a core portion (11, 12) having a first molding surface (11*a*, 12*a*) for molding a fiber preform (FB); a molding tool (20) having a second molding surface (20*a*, 20*b*) for molding the fiber preform and a recessed portion (21) that accommodates the core portion; a sealing member (30) that forms a sealed space (CS) by sealing the fiber preform in the molding tool in which the core portion is accommodated in the recessed portion; a suction portion (40) that suctions the air in the sealed space to depressurize the sealed space; a resin injection portion (50) that injects a resin material (RM) into the fiber preform which is sealed in the sealed space depressurized by the suction portion; and a moving mechanism (61, 62) that separates the first molding surface from the fiber preform including the resin material which is molded by the first molding surface and cured, in which a first groove portion (11*b*, 12*b*) which extends in a predetermined direction and through which the resin material flows is formed on the first molding surface, and the moving mechanism moves the core portion along the predetermined direction in which the first groove portion extends, while maintaining a state in which the first molding surface is in contact with the fiber preform.

According to the fiber-reinforced composite material molding device according to the present disclosure, the fiber preform is disposed on the first molding surface of the core portion and the second molding surface of the molding tool, the sealed space is formed by sealing the fiber preform on the molding tool in which the core portion is accommodated in the recessed portion of the molding tool, with the sealing member, and the air in the sealed space is suctioned to depressurize the sealed space, so that the resin material is injected into the sealed space. The resin material injected into the sealed space infiltrates into the fiber preform when the resin material is guided from a region into which the resin material is injected from the resin injection portion to a region suctioned by the suction portion.

According to the fiber-reinforced composite material molding device according to the present disclosure, on the first molding surface of the core portion, the first groove portion which extends in the predetermined direction and through which the resin material flows is formed. By allowing the resin material to flow through the first groove portion, the resin material is reliably diffused into a surface of the fiber preform which is molded by the first molding surface of the core portion. On the other hand, when the resin material remaining in the groove portion is cured, the resin material cured along a shape of the groove portion adheres to the surface of the fiber preform and enters a state of meshing with the first groove portion.

According to the fiber-reinforced composite material molding device according to the present disclosure, the moving mechanism moves the core portion along the predetermined direction in which the first groove portion extends, while maintaining a state in which the first molding surface is in contact with the fiber preform. Since the direction in which the core portion moves coincides with the predetermined direction in which the first groove portion extends, when the core portion moves, the first groove portion does not interfere with the resin material having a protruding shape formed on the surface of the product. Therefore, it is possible to provide the fiber-reinforced composite material molding device in which the core portion can be moved without interfering with the product, and the resin material can be diffused in the surface direction of the fiber preform to infiltrate into the entire fiber preform.

In the fiber-reinforced composite material molding device according to the present disclosure, a configuration is preferable in which the core portion has a second groove portion (11g, 12g) through which the resin material flows from a contact surface (21a) of the recessed portion toward the fiber preform, the molding tool has a third groove portion (21b) which is formed on the contact surface and through which the resin material flows, and the core portion is disposed in the recessed portion so that an end portion of the second groove portion on a contact surface side communicates with the third groove portion.

According to the fiber-reinforced composite material molding device according to the present configuration, since the end portion of the second groove portion, through which the resin material flows from the contact surface of the recessed portion toward the fiber preform, on the contact surface side communicates with the third groove portion formed on the contact surface, the resin material flowing through the third groove portion can be reliably guided to the fiber preform through the second groove portion.

The fiber-reinforced composite material molding method described in the embodiment described above is identified as follows, for example.

The fiber-reinforced composite material molding method according to the present disclosure includes: a disposing step (S102) of disposing a core portion having a first molding surface for molding a fiber preform in a recessed portion of a molding tool having a second molding surface for molding the fiber preform; a sealing step (S103) of forming a sealed space by sealing the fiber preform on the molding tool in which the core portion is accommodated in the recessed portion, with a sealing member; a resin injection step (S104) of suctioning the air in the sealed space to depressurize the sealed space and inject a resin material into the fiber preform sealed in the sealed space; and a moving step (S107) of separating the first molding surface from the fiber preform including the resin material which is molded by the first molding surface and cured, in which a first groove portion which extends in a predetermined direction and through which the resin material flows is formed on the first molding surface, and in the moving step, the core portion is moved along the predetermined direction in which the first groove portion extends, while maintaining a state in which the first molding surface is in contact with the fiber preform.

According to the fiber-reinforced composite material molding method according to the present disclosure, the fiber preform is disposed on the first molding surface of the core portion and the second molding surface of the molding tool, the sealed space is formed by sealing the fiber preform on the molding tool in which the core portion is accommodated in the recessed portion of the molding tool, with the sealing member, and the air in the sealed space is suctioned to depressurize the sealed space, so that the resin material is injected into the sealed space. The resin material injected into the sealed space infiltrates into the fiber preform when the resin material is guided from a region into which the resin material is injected from the resin injection portion to a region suctioned by the suction portion.

According to the fiber-reinforced composite material molding method according to the present disclosure, on the first molding surface of the core portion, the first groove portion which extends in the predetermined direction and through which the resin material flows is formed. By allowing the resin material to flow through the first groove portion, the resin material is reliably diffused into a surface of the fiber preform which is molded by the first molding surface of the core portion. On the other hand, when the resin material remaining in the groove portion is cured, the resin material cured along a shape of the groove portion adheres to the surface of the fiber preform and enters a state of meshing with the first groove portion.

According to the fiber-reinforced composite material molding method according to the present disclosure, in the moving step, the core portion is moved along the predetermined direction in which the first groove portion extends, while maintaining a state in which the first molding surface is in contact with the fiber preform. Since the direction in which the core portion moves coincides with the predetermined direction in which the first groove portion extends, when the core portion moves, the first groove portion does not interfere with the resin material having a protruding shape formed on the surface of the product. Therefore, it is possible to provide the fiber-reinforced composite material molding method in which the core portion can be moved without interfering with the product, and the resin material can be diffused in the surface direction of the fiber preform to infiltrate into the entire fiber preform.

In the fiber-reinforced composite material molding method according to the present disclosure, a configuration is preferable in which the core portion has a second groove portion through which the resin material flows from a contact surface of the recessed portion toward the fiber preform, the molding tool has a third groove portion which is formed on the contact surface and through which the resin material flows, and in the disposing step, the core portion is disposed in the recessed portion so that an end portion of the second groove portion on a contact surface side communicates with the third groove portion.

According to the fiber-reinforced composite material molding method according to the present configuration, since the end portion of the second groove portion, through which the resin material flows from the contact surface of the recessed portion toward the fiber preform, on the contact surface side communicates with the third groove portion formed on the contact surface, the resin material flowing through the third groove portion can be reliably guided to the fiber preform through the second groove portion.

REFERENCE SIGNS LIST 11, 11A core portion
11a, 11Aa molding surface
11b, 11e, 11f, 11g, 11Ab1, 11Ab2, 11Ae, 11Af groove portion
11c, 11Ac side surface
11d, 11Ad bottom surface
12,12A core portion
12a, 12Aa molding surface
12b, 12e, 12f, 12g, 12Ab1, 12Ab2, 12Ae, 12Af groove portion
12c, 12Ac side surface
12d, 12Ad bottom surface
20 first curing mold
20a, 20b molding surface
21 recessed portion
21a upper surface
21b, 22a, 22b groove portion
25 second curing mold
25a, 25b molding surface
30 bagging film
40 suction line
50 resin injection line
61, 62 moving mechanism
100 molding device
200 composite material
320 suction source
330 supply source
CS sealed space
FB fiber preform
FB1 first fiber preform
FB2 second fiber preform
FB3 third fiber preform
FB3a, FB3b end surface
FB3c side surface
FB3d, FB3f upper surface
FB3e side surface
LD longitudinal direction
PD, PDa, PDb Predetermined direction
RM resin material
ST sealant tape

The invention claimed is:

1. A fiber-reinforced composite material molding device comprising:
    a core portion having a first molding surface for molding a fiber preform;
    a molding tool having a second molding surface for molding the fiber preform and a recessed portion that accommodates the core portion;
    a seal that forms a sealed space by sealing the fiber preform on the molding tool in which the core portion is accommodated in the recessed portion;
    a suction portion that suctions air from the sealed space to depressurize the sealed space;
    a resin injection portion that injects a resin material into the fiber preform which is sealed in the sealed space depressurized by the suction portion; and
    a moving mechanism that separates the first molding surface from the fiber preform including the resin material which is molded by the first molding surface and cured,
    wherein a first groove portion which extends in a predetermined direction and through which the resin material flows is formed on the first molding surface, and
    the moving mechanism moves the core portion along the predetermined direction in which the first groove portion extends, while maintaining a state in which the first molding surface is in contact with the fiber preform,
    wherein the core portion has a second groove portion through which the resin material flows from a contact surface of the recessed portion toward the fiber preform,
    the molding tool has a third groove portion which is formed on the contact surface and through which the resin material flows, and
    the core portion is disposed in the recessed portion so that an end portion of the second groove portion on a contact surface side communicates with the third groove portion.

2. A fiber-reinforced composite material molding method comprising:
    a disposing step of disposing a core portion having a first molding surface for molding a fiber preform in a recessed portion of a molding tool having a second molding surface for molding the fiber preform;
    a sealing step of forming a sealed space by sealing the fiber preform on the molding tool in which the core portion is accommodated in the recessed portion, with a seal;
    a resin injection step of suctioning air from the sealed space to depressurize the sealed space and injecting a resin material into the fiber preform sealed in the sealed space; and
    a moving step of separating the first molding surface from the fiber preform including the resin material which is molded by the first molding surface and cured,
    wherein a first groove portion which extends in a predetermined direction and through which the resin material flows is formed on the first molding surface, and
    in the moving step, the core portion is moved along the predetermined direction in which the first groove portion extends, while maintaining a state in which the first molding surface is in contact with the fiber preform,
    wherein the core portion has a second groove portion through which the resin material flows from a contact surface of the recessed portion toward the fiber preform,
    the molding tool has a third groove portion which is formed on the contact surface and through which the resin material flows, and
    in the disposing step, the core portion is disposed in the recessed portion so that an end portion of the second groove portion on a contact surface side communicates with the third groove portion.

* * * * *